United States Patent [19]

Bulman

[11] Patent Number: 5,063,826
[45] Date of Patent: Nov. 12, 1991

[54] ARMAMENT SYSTEM

[75] Inventor: Melvin J. Bulman, Colchester, Vt.

[73] Assignee: General Electric Company, Pittsfield, Mass.

[21] Appl. No.: 259,381

[22] Filed: Oct. 17, 1988

Related U.S. Application Data

[63] Continuation of Ser. No. 871,034, Jun. 5, 1986, abandoned.

[51] Int. Cl.⁵ .............................................. F41F 1/00
[52] U.S. Cl. .......................................... 89/8; 102/374
[58] Field of Search ............... 42/76.01; 89/7, 8, 31; 102/374, 376

[56] References Cited

U.S. PATENT DOCUMENTS

| | | | |
|---|---|---|---|
| 1,186,023 | 6/1916 | Moore | 89/31 |
| 1,620,994 | 3/1927 | Bustamante | 89/7 |
| 2,649,266 | 8/1953 | Darrieus | 102/374 |
| 2,965,000 | 12/1960 | Skinner | 89/7 |
| 3,253,511 | 5/1966 | Zwicky | 89/8 |
| 3,418,878 | 12/1968 | Stricklin | 89/8 |
| 4,664,631 | 5/1987 | Pederson et al. | 89/7 |
| 4,938,112 | 7/1990 | Hertzberg et al. | 89/7 |

FOREIGN PATENT DOCUMENTS 83954 12/1895 Fed. Rep. of Germany ......... 89/31

OTHER PUBLICATIONS

Brackett et al, "Computational Investigation of Oblique Detonation Ramjet-in-Tube Concepts", Journal of Propulsion and Power, vol. 5, No. 3, May-Jun. 1989, pp. 276-281.

Hertzberg et al, "An Explorator Study of Ram Accelerator Principles", AFATL-TR-88-94, Oct. 1988.

P. J. Wilbur et al, The Electrothermal Ramjet, "J. Spacecraft", vol. 20, No. 6, Nov.-Dec. 1983, pp. 603-610.

B. D. Shaw et al, The Annular Flow, Electrothermal Plug Ramjet, "J. Propulsion", Vol. 1, No. 6, Nov.-Dec. 1985, pp.417-424.

Primary Examiner—Stephen C. Bentley
Attorney, Agent, or Firm—Bailin L. Kuch

[57] ABSTRACT

An armament system provides a launch tube filled with a mixture of gaseous propellant and a projectile possessing an external surface configuration which is effective to initiate a ram jet effect between the external surface of said projectile and the inner wall of said launch tube when said projectile is inserted at a high velocity into and along said tube.

13 Claims, 6 Drawing Sheets

ARMAMENT SYSTEM

This is a continuation of co-pending application Ser. No. 06/871,034, filed on June. 5, 1986, now abandoned.

BACKGROUND OF THE INVENTION

1. Field of the Invention

This invention relates to an armament system wherein a projectile, in cooperation with its launching tube, functions as a ram jet.

2. Prior Art

Various schemes have been proposed to provide a projectile with a velocity greater than that achieved by a conventional projectile launched by a pulse of combustion gas.

In U.S. Pat. No. 3,253,511, issued May 31, 1966, F. Zwicky shows a hollow, full bore, projectile, characterized as a ram jet, disposed in a launching tube filled with a mixture of gasses. The largest outer diameter of the projectile is equal to the inner diameter of the tube so that the projectile makes a travelling seal with the tube, and all flow of gas from forward to rear of the projectile occurs through the projectile. Gaseous propellant enters through a forward opening, ignites within the projectile, and exits through a rear nozzle. The projectile is provided with an initial acceleration by a first stage, solid propellant, rocket.

In U.S. Pat. No. 4,051,762, issued Oct. 4, 1977, E. Ashley shows a full bore projectile spaced forwardly of a sub-caliber cavity generator by a volume of liquid propellant. The cavity generator progressively injects liquid propellant into a combustion volume aft of the generator.

In U.S. Pat. No. 2,971,473, issued Feb. 14, 1961 to C. Raynaud; U.S. Pat. No. 3,411,403, issued Nov. 19, 1968 to C. A. Rodenberger; U.S. Pat. No. 3,418,878, issued Dec. 31, 1968 to S. A. Stricklin; and U.S. Pat. No. 3,880,044, issued Apr. 29, 1975 to Al Korr et al, there are shown projectiles which are progressively accelerated along an explosive lined launch tube by their shock wave causing detonation of the lining immediately behind it.

In U.S. Pat. No. 2,783,684, issued Mar. 5, 1957 to Y. A. Yoler; U.S. Pat. No. 2,790,354, issued Apr. 30, 1957 to Y. A. Yoler et al; U.S. Pat. No. 3,086,424, issued Apr. 23, 1963 to T. W. Liao and U.S. Pat. No. 3,613,499, issued Oct. 19, 1971 to F. T. Hubbard et al; there are shown means for accelerating a projectile through a gas filled launch tube wherein the expansion of the gas is initiated by means external to the tube.

In U.S. Pat. No. 3,008,669, issued Nov. 14, 1961 to Tanczos et al; U.S. Pat. No. 3,273,334, issued Sept. 20, 1966 to Tanczos et al; and U.S. Pat. No. 3,386,249, issued June 4, 1968 to G. L. Dugger et al; there are shown ram jet engines in which fuel is fed from within the engine to be combusted on a portion of the external surface of the engine.

In U.S. Pat. No. 3,726,219, issued Apr. 10, 1973, R. G. Bolick shows a cartridge case which remains with the projectile and serves as a ram jet engine external to the gun tube.

Figure 8:
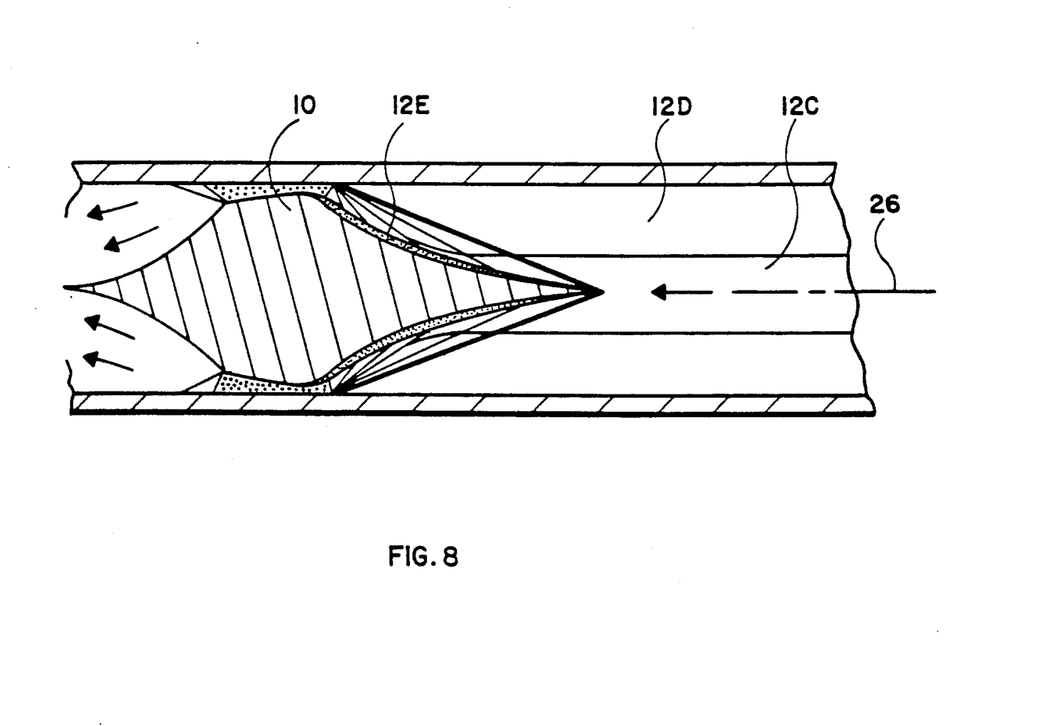
FIG. 8 is a schematic of the longitudinal cross-section of a pressure chamber of the system of FIG. 3.
Figure 8A:
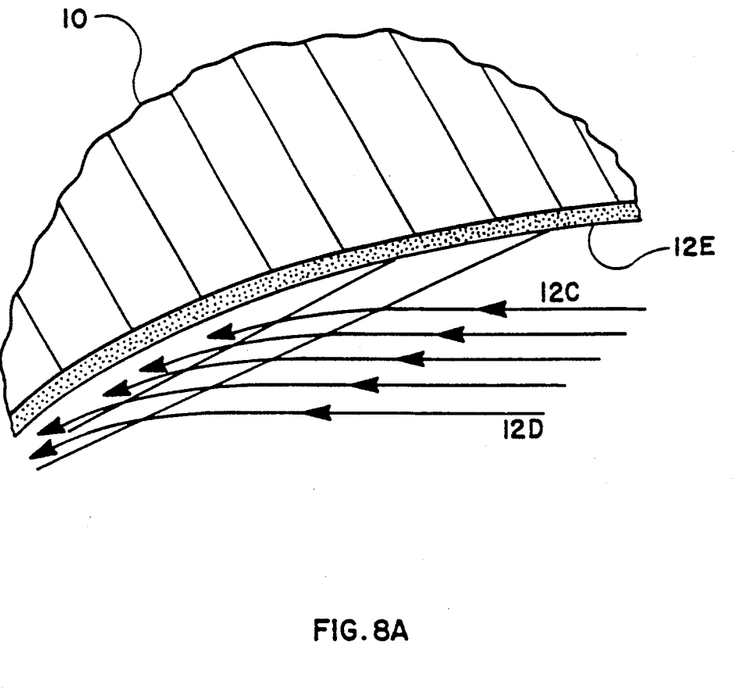
FIG. 8A is a detail of FIG. 8.

In "The Electrothermal Ramjet," *J. Spacecraft*, Vol 20, No. 6, Nov.–Dec. 1983, pp 603–610, P. J. Wilbur et al in FIG. 8 show an annular flow ram jet configuration wherein heat is provided to noncombustible propellant electrically, either electromagnetically or in the form of electrical current.

SUMMARY OF THE INVENTION

It is an object of this invention to provide a mechanism to convert high level chemical energy into useful work at high levels of efficiency and with few moving parts.

It is another object of this invention to provide a solid projectile which acts as a ram jet engine during its travel through the launch tube.

A feature of this invention is the provision of an armament system having a launch tube filled with a mixture of combustible gaseous propellant and a projectile possessing an external surface configuration which is effective to initiate a ram jet effect, including compression, ignition, combustion and expansion, between the external surface of said projectile and the inner wall of said launch tube when said projectile is inserted at a high velocity into and along said tube.

BRIEF DESCRIPTION OF THE DRAWING

These and other objects, features and advantages of the invention will be apparent from the following specification thereof taken in conjunction with the accompanying drawing in which.

DESCRIPTION OF THE INVENTION

Jet propulsion is a process whereby a projectile is propelled forwardly by the reaction produced by a mass expelled aftwardly away from the projectile.

A rocket has a simple form of jet propulsion. In a rocket, the reaction mass and the source of energy are both carried on board the rocket, which limits the propulsion efficiency of the rocket.

In an air breathing jet engine, higher levels of propulsion efficiency are possible, than in a rocket, because the reaction mass is not carried on board the projectile, but drawn from the surrounding atmosphere. Only the energy source, i.e. fuel is carried on board.

Figure 1:
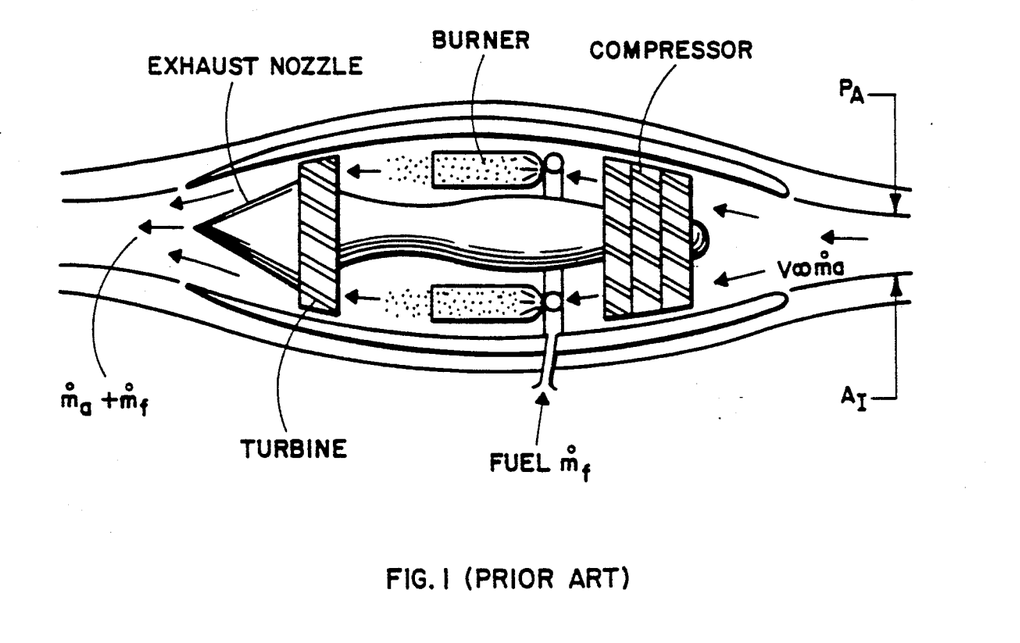
FIG. 1 is a schematic of a conventional air breathing jet engine.

FIG. 1 shows a typical air breathing jet engine. The thrust generated by this engine may be written in general terms as:

$$F_N = (\overset{\circ}{M}_a + \overset{\circ}{M}_f)V_j + P_e A_e - D_p - \overset{\circ}{M}_a V_\infty - P_A A_I \quad \text{(Eq. 1)}$$

Where:
$F_n$ = net thrust of engine.
$\overset{\circ}{M}_a$ = mass flow of air through engine in slugs/sec.
$\overset{\circ}{M}_f$ = mass flow of fuel in slugs/sec.

$V_j$ = exhaust velocity of gases.
$P_e$ = pressure at exit of exhaust nozzle.
$A_e$ = exit area of exhaust nozzle.
$D_p$ = drag on engine pod.
$V_\infty$ = free stream velocity of the air or the engine velocity through the air.
$P_a$ = air pressure at the air inlet.
$A_I$ = air inlet area.

Eq. 1 may be simplified by the use of some reasonable assumptions such as $P_A = P_e$ and $\overset{\circ}{M}_f < < \overset{\circ}{M}_a$ so that:

$$F_N = M_a(V_j - V_\infty) - D_p. \quad \text{(Eq. 2)}$$

It will be seen that net thrust will only be generated when $V_j > V_\infty$. In a turbo jet engine $V_j$ is made higher then $V_\infty$ by compressing the inletted air via a compressor and then heating the compressed air by burning fuel. The heated and partially combusted air is then allowed to escape and expand as exhaust through an exhaust nozzle at high velocity. The turbo jet engine works well at relatively low speeds, e.g., up to mach 2, but at higher speeds, e.g., mach 3+, the ram jet engine is a simpler and more efficient device.

Figure 2:
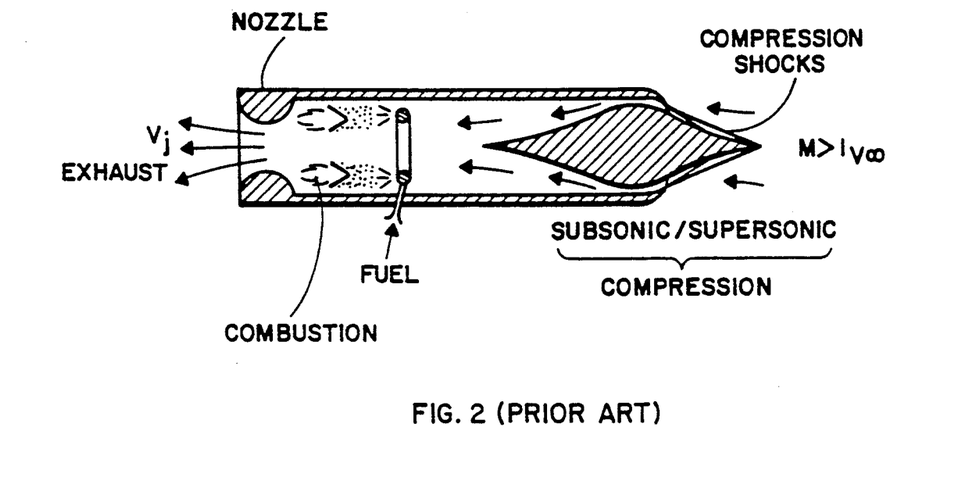
FIG. 2 is a schematic of a conventional ram jet engine.

FIG. 2 shows a typical ram jet engine. In a ram jet engine, the compression of the inletted air is accomplished by a number of weak shock waves in the inlet that compress the inletted air. Fuel is burned to heat the compressed air before expanding it through an exhaust nozzle. The ram jet engine is a very simple and efficient device, but its main draw back is that its efficiency falls off rapidly below and above its designed velocity. This is so because the inlet geometry required for any one mach number is different from that required for any other. This requirement for a complex, variable geometry inlet for use through a range of velocities is largely responsible for the limited utilization of ram jet propulsion.

Figure 3:
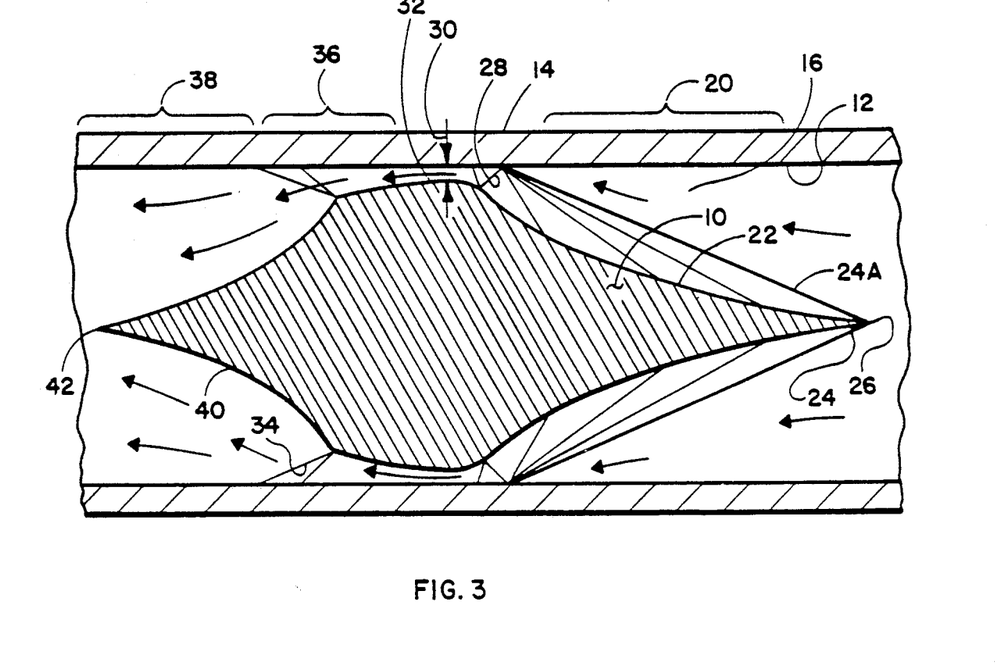
FIG. 3 is a schematic of an armament system, having a projectile in a launch tube, embodying this invention.

FIG. 3 shows an armament system embodying this invention. The system includes a projectile 10 traveling within and along the bore 12 of a launching tube or gun barrel 14. The projectile is symmetrical about its longitudinal axis and has an outer surface having various diameters, the largest diameter being smaller than the inner diameter of the bore 12 to provide an annular gap 16 between the projectile and the bore. The bore 12 is prefilled with a combustible mixture of gases and the projectile is inserted at a velocity adequate to provide ram jet function in the annular gap 16. To enable the ram jet function, the projectile configuration has (i) a compression section 20 shown as a concave surface 22 originating at a vertex 24 on the longitudinal axis 26 and terminating at a transition 28, (ii) an ignition point 30 located along a convex section 32 which follows from the transition 28 and approaches the surface of the bore 12 and then diverges from the bore surface to a transition 34 and serves as (iii) a combustion zone 36, and (iv) an expansion section 38, shown as a concave surface 40 which follows from the transition 34 and terminates at a vertex 42 on the axis 26.

In the system shown in FIG. 3, the gaseous mixture is hydrogen and oxygen in the proportion of one part hydrogen to 2.7 parts oxygen by weight. This mixture is rich in hydrogen to give it a low molecular weight. The mixture is preheated to 1000° R, at which temperature the speed of sound in this gas is 2,800 ft/sec. The mixture is compressed to 5,000 psi to provide a gas density of 2.9 lb./ft$^3$. If the bore 12 has a diameter of 120 mm and the projectile is traveling at a velocity of 20,000 ft/sec., then the effective intake of the annular gap 16 will be a mass flow of over 7,000 lbs/sec.

The mach number of this flow as it approaches the annular gap is 7.14. An oblique shock wave 24A attached to the vertex 24 of the concave cone 22 deflects the incoming flow to become parallel to the annular surface of the cone 22. A pressure and a temperature rise occur as the flow passes through and is decelerated by this shock wave. The conical surface passes through its transition 28 further compressing the flow of the gaseous mixture until the minimum annular cross-sectional area of the annular gap 16 is reached. At this point, i.e., at the cross-sectional plane 30, the compression heat is sufficient to ignite the gaseous mixture. If it is not adequate, then a source of ignition can be provided, e.g., a flame holder.

Since the flow entering the combustion zone 36 is supersonic, i.e., mach number is 4.5, this system can be characterized as a supersonic combustion ram jet, i.e., a scramjet. The combustion zone 36 provides a constant pressure, and leads to the expansion zone 38, wherein the gases accelerate to a higher velocity to provide thrust to the projectile 10.

Since the exhaust pressure is not required to be equal to the free stream pressure, as distinguished from the case of a free flying jet engine, the higher exhaust pressure here contributes to the total thrust.

It is desirable to avoid ignition of the gaseous mixture forward of the ignition point 30. This is accomplished by keeping the compression generated temperature below the auto-ignition temperature until very near the desired ignition point. Ignition and combustion then proceed very rapidly due to the premixing of the fuel and the oxidizer and the preheating of this mixture, as distinguished from the slow combustion conventionally found in a free flying scramjet.

Even though the compression generated temperature is kept relatively low, a significant increase in pressure is available, e.g., up to 17:1, and a thrust of 360,000 lbs. is indicated. This represents a power of 13 million horse-power without any moving parts.

Although the compression temperature is kept below the autoignition temperature, frictional heat build up in the boundary layer may lead to premature ignition.

Figure 7:
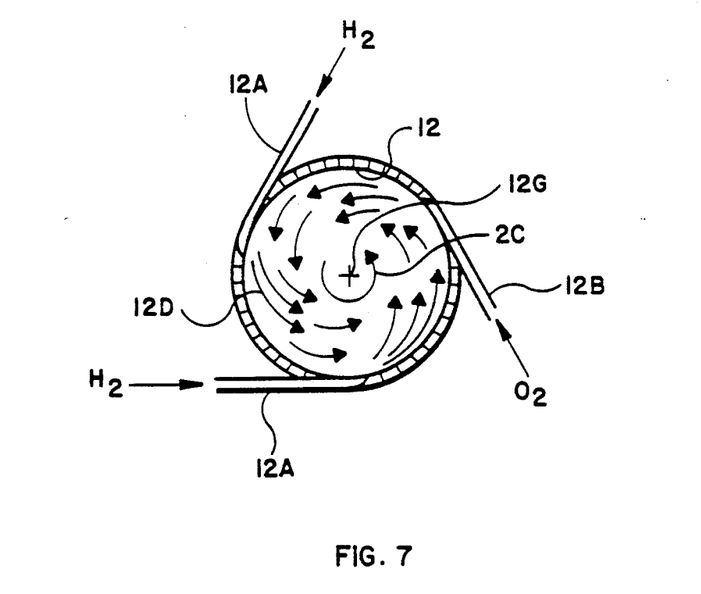
FIG. 7 is a schematic of the transverse cross-section of a pressure chamber of the system of FIG. 3.

An arrangement for avoiding this premature ignition of fuel and oxidizer gases is shown in FIGS. 7 and 8. In this arrangement the gasses are sequentially injected into the bore 12 along chordal paths to provide circular or spiral flow about the longitudinal axis 26. The fuel is injected first, e.g., from tangentially oriented nozzles 12A, and the oxidizer is injected later from similarly tangentially directed nozzles 12B, to provide a central core 12C of relatively pure fuel which is nonflammable, surrounded by a combustible annulus 12D of mixed fuel and oxidizer. The tip 24 of the projectile 10 enters the central core 12C and the compression surface 20 of the projectile receives a boundary layer 12E of fuel which while quite hot due to friction is nonflammable. Thus ignition is precluded until the ignition point 30.

Figure 4:
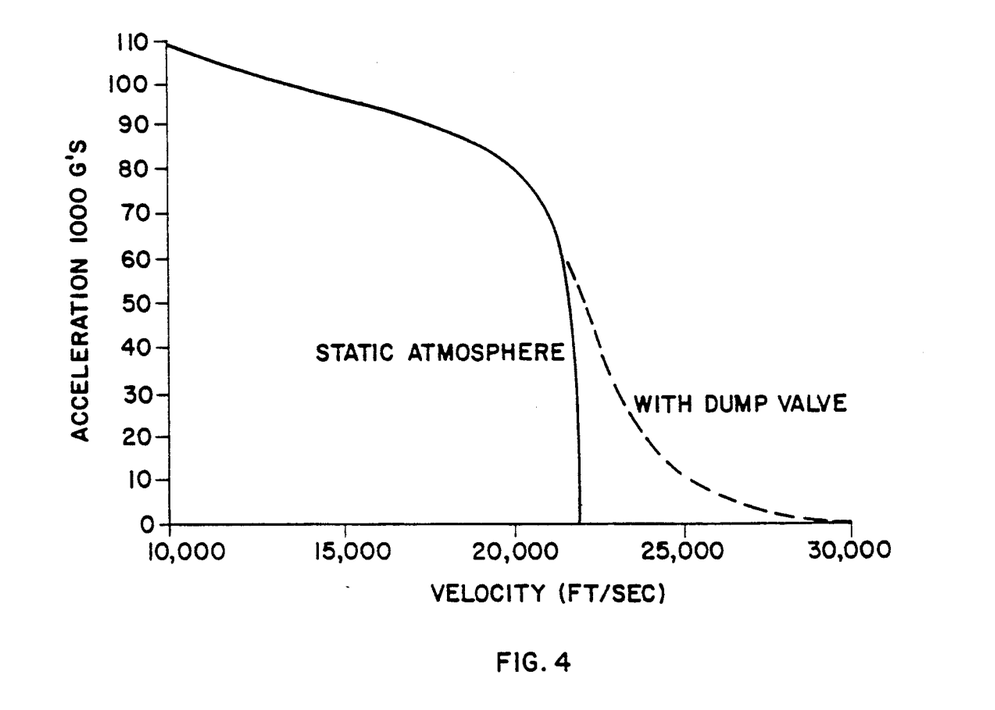
FIG. 4 is a chart of the performance of the system of FIG. 3.

FIG. 4 shows acceleration as a function of the velocity of the projectile 10, here having a weight of 2 Kg. The acceleration falls progressively from a start-up velocity of 10,000 ft/sec towards 20,000 ft/sec and drops to zero shortly thereafter. This abrupt loss in performance is a result of the increasing losses at the higher velocities. The maximum velocity possible with this arrangement is approximately 23,000 ft/sec. Reducing these losses would increase this terminal velocity, but unless the losses were zero, a much higher velocity is unlikely.

Figure 5:
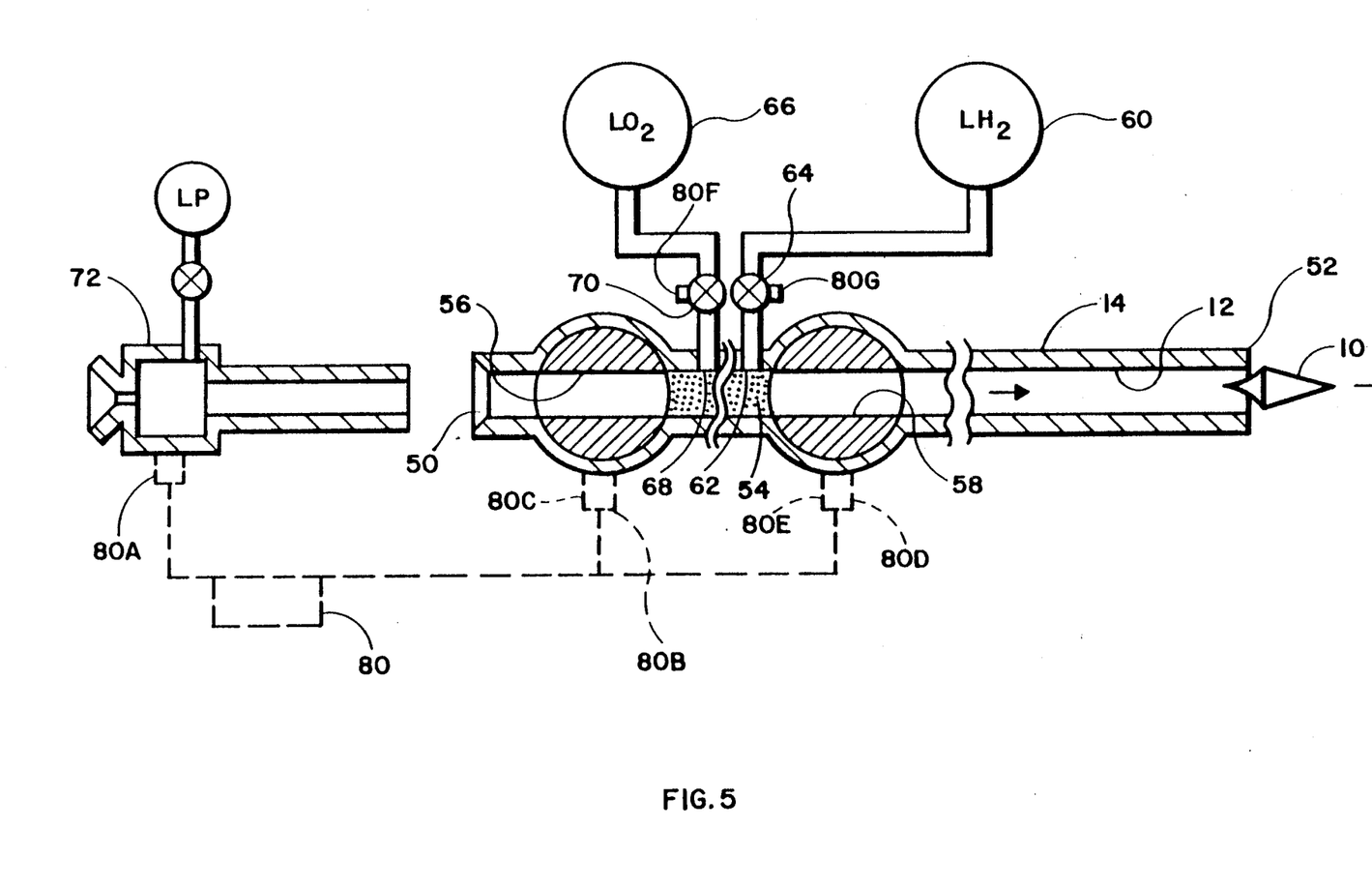
FIG. 5 is a schematic of an armament system embodying this invention showing a two stage system having a first gun to provide the initial acceleration to the projectile and to inject such projectile into the launch tube of FIG. 3.

FIG. 5 shows a system for achieving yet higher terminal velocities. In the same manner that the ground speed of an airplane is increased by a tail wind, the terminal velocity of the projectile 10 can be increased by forwardly accelerating the gases in front of the projectile. In this way the terminal velocity of the projectile can be increased by approximately the velocity of the gas flow. The launching tube 14 has an open aft end 50 and an open forward end 52. A pressure chamber 54 is defined by an aft insertion valve 56 and a forward dump valve 58. Valves 56 and 58 may be ball type valves which when open will pass the projectile 10 there through. An exemplary chamber may be 120 mm diameter by 20 m long. A pressurized source 60 of fuel has one or more inlets 62 through a valve 64 into the forward portion of the chamber 54, (as shown in FIGS. 7 and 8). A pressurized source 66 of oxidizer has one or more inlets 68 through a valve 70 into the aftward portion of the chamber 54. The chamber may thereby be filled with hydrogen and oxygen at a pressure of 5,000 psi. A suitable projectile insertion means 72 is provided aft of the launching tube 14, to inject the projectile into the aft end 50 of the tube 14 at an initial velocity of 6–10,000 ft/sec. An appropriate projectile insertion means, for example, is shown in U.S. Pat. No. 4,043,248, issued Aug. 23, 1977 to M. J. Bulman et al. The muzzle of the insertion means 72 is spaced aft of the open aft end 50 to provide a gap through which to vent the combustion gases from the muzzle.

A control means 80 is provided to synchronize the operation of the projectile insertion means 72 and the valves 56 and 58 and the valves 64 and 70. It includes means 80A to trigger the insertion means 72 at the correct time in relation to the opening of the insertion valve 56 and the dump valve 58; means 80B to open and to close the insertion valve 56 and means 80C to detect the timely progress of the opening of the insertion valve 56; means 80D to open and to close the dump valve 58 and means 80E to detect the timely progress of the opening of the dump valve 58; means 80F to open and to close the oxidizer feed valve 70; and means 80G to open and to close the fuel feed valve 64.

Figure 6:
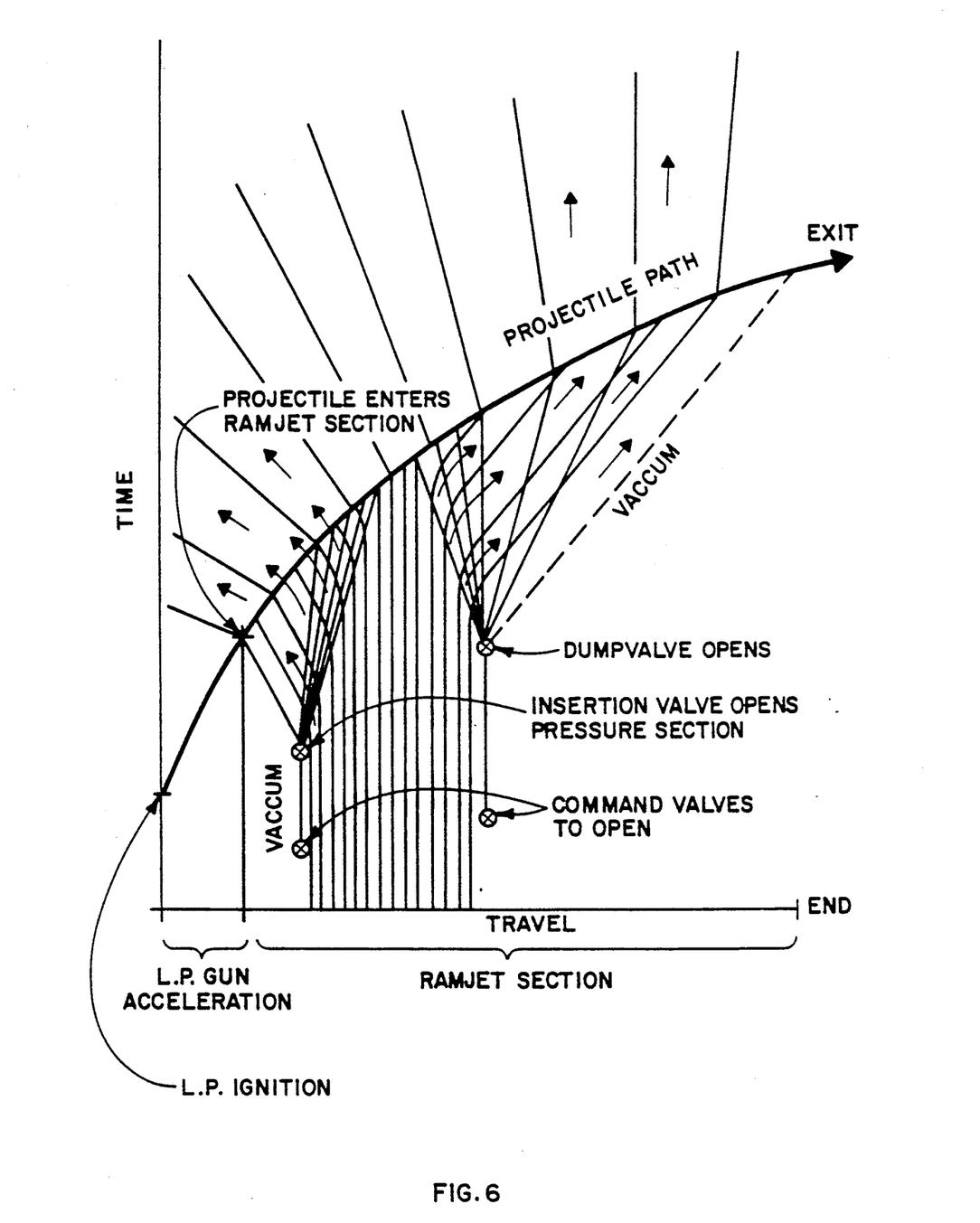
FIG. 6 is a chart of the propulsion path of the system of FIG. 5.

FIG. 6 shows the displacement of the projectile 10 along the bore 12 in the system of FIG. 5 as a function of time. Initially the pressure chamber 54 is closed off by the closed insertion valve 56, the closed dump valve 58, the closed fuel valve 64 and the closed oxidizer valve 70. Thereafter: (i) The fuel valve 64 is opened and closed to admit a predetermined quantity of fuel into the pressure chamber 54. (ii) The oxidizer valve 70 is opened and closed to admit a predetermined quantity of oxidizer into the pressure chamber, substantially as an annulus around a core of fuel. (iii) The insertion valve 56 and the dump valve 58 are opened, and as they are detected to be approaching their fully open dispositions, the insertion means is triggered to accelerate a projectile 10 into the aft end 50 of the bore 10.

The projectile accelerates through the initially aftward flowing and then static mixture of gasses to approximately 20,000 ft. sec whereupon it encounters a rarefaction wave moving aftward from the open dump valve 58. The opening of the dump valve permits the acceleration of a sufficient quantity of gas into the forward part of the launching tube to allow continued acceleration of the projectile to the desired velocity, e.g. 26,000 ft/sec. This is shown in FIG. 4 as the dashed line extending out to velocities of 30,000 ft/sec. The acceleration after 20,000 ft/sec. drops due to the reduction in gas density as a result of the rapid expansion of the gases when the dump valve 58 is opened, but is higher than would be possible without the dump valve.

As stated previously, the performance of a ram jet is strongly related to the efficiency of the compression section (i.e. the inlet). The compression is the result of the pattern of shock waves set up between the center body (e.g. the projectile) and the tube wall. This pattern and the compression achieved can be optimized as the projectile accelerates through different mach numbers by adjusting the tube diameter and, thereby, the throat area (i.e., the gap, i.e., by varying the diameter of the bore 12 along the length of the tube 14.

What is claimed is:
1. An armament system comprising:
   a launch tube for a projectile, said launch tube having an aft end for receiving said projectile, a forward end and an inner tube surface;
   means for filling said tube with a combustible gaseous propellant;
   a projectile having an external surface configuration selected to provide a ramjet effect, including compression, ignition, combustion and expansion, between said external surface configuration and said inner tube surface when said projectile is inserted at a velocity above a minimum velocity into said tube fueled with combustible gaseous propellant;
   said projectile surface configuration having a maximum diameter which is smaller than the minimum diameter of said inner tube surface to provide an annular space therebetween;
   said projectile external surface configuration including:
     a vertex located on the axis of said projectile;
     first and second annular surface transitions:
     a leading portion having a concave surface of rotation originating at said vertex and having a progressively increasing diameter between said vertex and said first transition;
     an intermediate portion having a convex surface of rotation between said first and second transitions, said convex surface progressively increasing in diameter to said maximum diameter and thereafter decreasing in diameter to said second transition; and
     a trailing portion having a concave surface of rotation originating at said second transition and progressively decreasing in diameter;
   wherein, in conjunction with said inner tube surface:
     said leading portion provides said compression of said gas;
     said intermediate portion provides said ignition and combustion of said gas; and
     said trailing portion provides said expansion of said gas;
   said launch tube being provided with:
     first valve means for closing and opening said launch tube disposed near said tube aft end; and
     second valve means axially spaced from said first valve means for closing and opening said launch tube,
     said first and said second valve means defining a pressure chamber in said launch tube for re- ceiving and containing combustible gaseous propellant from said filling means;

said filling means including:
a source of fuel gas;
third valve means coupled to said fuel gas source;
first tangentially directed nozzle means coupling said third valve means to said pressure chamber to provide a chordal path for the injection of fuel gas into said chamber,
a source of oxidizer gas,
fourth valve means coupled to said oxidizer gas source,
second tangentially directed nozzle means coupling said fourth valve means to said pressure chamber to provide a chordal path for the injection of oxidizer gas into said chamber; and control means to sequentially
(i) open and close said third valve means, and thereafter to
(ii) open and close said fourth valve means.

2. An armament system comprising:
a launch tube for a projectile, said launch tube having an aft end for receiving said projectile, a forward end and an inner tube surface;
means for filling said tube with a combustible gaseous propellant;
a projectile having an external surface configuration selected to provide a ramjet effect, including compression, ignition, combustion and expansion, between said external surface configuration and said inner tube surface when said projectile is inserted at a velocity above a minimum velocity into said tube fueled with combustible gaseous propellant;
said projectile surface configuration having a maximum diameter which is smaller than the minimum diameter of said inner tube surface to provide an annular space therebetween;
said projectile surface configuration including:
a vertex located on the axis of said projectile;
first and second annular surface transitions;
a leading portion having a concave surface of rotation originating at said vertex and having a progressively increasing diameter between said vertex and said first transition;
an intermediate portion having a convex surface of rotation between said first and second transitions, said convex surface progressively increasing in diameter to said maximum diameter and thereafter decreasing in diameter to said second transition; and
a trailing portion having a concave surface of rotation originating at said second transition and progressively decreasing in diameter;
wherein, in conjunction with said inner tube surface;
said leading portion provides said compression of said gas;
said intermediate portion provides said ignition and combustion of said gas; and
said trailing portion provides said expansion of said gas; and
means for inserting said projectile into said tube through said aft end at a velocity greater than a minimum velocity;
said launch tube being provided with:

first valve means for closing and opening said launch tube disposed near said tube aft end, and
second valve means axially spaced from said first valve means for closing and opening said launch tube,
said first and said second valve means defining a pressure chamber in said launch tube for receiving and containing combustible gaseous propellant from said filling means;
said filling means including:
a source of fuel gas;
third valve means coupled to said fuel gas source,
a first inlet coupling said third valve means to said pressure chamber,
a source of oxider gas,
fourth valve means coupled to said oxidizer gas source,
a second inlet coupling said fourth valve means to said pressure chamber;
control means to sequentially:
(i) close said first and said second valve means to close said pressure chamber;
(ii) open and thereafter close said third and fourth valve means to charge said pressure chamber with gaseous propellant;
(iii) actuate said projectile inserting means to insert a projectile through said tube aft end.
(iv) open said first valve means before said projectile has entered said tube,
(v) open said second valve means before said projectile has entered said pressure chamber.

3. An armament system comprising:
a launch tube for projectiles having an aft end, a forward end and an inner tube surface;
means for initially filling an intermediate portion of said tube spaced from said aft and forward ends with a volume of combustible gaseous propellant;
a projectile having external surface configuration means for providing a ram jet effect, including compression, ignition, combustion and expansion, between said external surface configuration means and said inner tube surface when said projectile is inserted into and along said tube fueled with combustible gaseous propellant at a velocity above a minimum velocity;
said projectile having a maximum diameter which is smaller than the minimum diameter of said inner tube surface to provide an annular space between said projectile and said inner tube surface;
said projectile external surface configuration means including discrete, successive surface portions separated by transitions including:
a leading portion having a concave surface of rotation originating at a first vertex on the axis of said projectile and having a progressively increasing diameter up to a first one of said transitions;
an intermediate portion having a convex surface of rotation originating at said first transition and having a progressively increasing, maximum and decreasing diameter to a second one of said transitions; and
a trailing portion having a concave surface of rotation originating at said second transition and progressively decreasing to a second vertex on said projectile axis, said last recited concave surface having a shorter axial length than said first recited concave surface; and wherein, in conjunction with said inner tube surface;
  said leading portion serves as a gas compressor,
  said intermediate portion serves as a gas igniter and combustor; and
  said trailing portion serves as a gas expander; and said launch tube is provided with:
  a first, projectile inlet, valve means for closing and opening said launch tube and disposed adjacent to said tube aft end,
  a second, projectile outlet, valve means for closing and opening said launch tube and disposed remote from said tube aft end;
  said first and said second valve means being disposed mutually spaced apart to define, with said launch tube, said intermediate portion of said tube which serves as a pressure chamber for receiving and containing combustible gaseous propellant from said filling means.

4. A system according to claim 3 wherein:
said filling means includes:
  a source of fuel gas coupled by a third valve means to said pressure chamber, and
  a source of oxidizer gas coupled by a fourth valve means to said pressure chamber.

5. A system according to claim 4 further including:
means for inserting said projectile into said tube through said aft end at said velocity above a minimum velocity;
control means to sequentially:
  (i) close said first and said second valve means to close said pressure chamber;
  (ii) open and thereafter close said third and fourth valve means to charge said pressure chamber with combustible gaseous propellant;
  (iii) actuate said projectile inserting means to insert a projectile through said tube aft end;
  (iv) open said first valve means before said projectile has entered said tube;
  (v) open said second valve means before said projectile has entered said pressure chamber.

6. A system according to claim 4 wherein
said filling means further includes:
  a first tangentially directed nozzle means coupling said third valve means to said pressure chamber to provide a chordal path of injection of fuel gas into said chamber, and
  a second tangentially directed nozzle means coupling said fourth valve means to said pressure chamber to provide a chordal path of injection of oxidizer gas into said chamber.

7. A system according to claim 6 wherein:
said control means sequentially:
  (i) opens and closes said third valve means, and thereafter
  (ii) opens and closes said fourth valve means.

8. An armament system comprising:
a launch tube for projectiles, said tube having an aft end, forward end and an inner tube surface;
means for initially filling an intermediate portion of said tube spaced from said aft and forward ends with a volume of gaseous fuel and a volume of gaseous oxidizer, which volumes when intermixed form a combustible gaseous propellant and for containing said intermixed propellant within said intermediate portion; and an asymmetrically elongate projectile having an external surface configuration including discrete, successive surface portions separated by transitions, said surface portions being selected to provide a ram jet effect between said inner tube surface and said external surface configuration following the insertion of said projectile at a velocity above a minimum velocity into said propellant-containing intermediate tube portion, said ram jet effect providing in sequence at said successive surface portions:
  compression of said propellant,
  ignition of said propellant,
  combustion of said propellant, and
  expansion of the products of combustion of said propellant; and the maximum diameter of said projectile is smaller than the minimum diameter of said inner tube surface to provide an annular space between said projectile and said inner tube surface; and said discrete external surface portions of said projectile include:
  a leading portion having a concave surface of rotation originating at a first vertex on the axis of said projectile and having a progressively increasing diameter up to a first one of said transitions,
  an intermediate portion having a convex surface of rotation originating at said first transition and having a progressively increasing, maximum and decreasing diameter to a second one of said transitions, and
  a trailing portion having a concave surface of rotation originating at said second transition and progressively decreasing to a second vertex on said projectile axis, said last-recited concave surface having a shorter axial length than said first-recited concave surface, wherein, in conjunction with said inner tube surface,
  said leading portion serves as a gas compressor,
  said intermediate portion serves as a gas igniter and combustor, and
  said trailing portion serves a gas expander.

9. A system according to claim 8 wherein:
said filling means includes:
  first means for initially injecting a gaseous fuel along a first path into said intermediate portion of said tube, and
  second means for subsequently injecting a gaseous oxidizer along a second path into said intermediate portion of said tube,
said first and second means thereby providing in said intermediate portion of said tube a volume of combustible gaseous propellant having a central core volume of relatively pure fuel which is nonflammable, surrounded by an annular volume of mixed fuel and oxidizer which is flammable.

10. A system according to claim 8 wherein:
said means for containing said intermixed propellant includes:
  a first, projectile inlet, valve means for closing and opening said launch tube and disposed adjacent to said tube aft end,
  a second, projectile outlet, valve means for closing and opening said launch tube and disposed remote from said tube aft end,
  said first and said second valve means being disposed mutually spaced apart to define, with said intermediate portion of said launch tube, a pressure chamber which is adapted to receive and to contain combustible gaseous propellant from said filling means.

11. An armament system comprising:
a launch tube for projectiles, said tube having an open to the atmosphere aft end, and open to the atmosphere forward end, and an inner tube surface;
a closed, but openable, intermediate portion of said tube defined by:
  an aft, openable, reusable closure means disposed within said tube, spaced forwardly from said tube aft end; and
  a forward, openable reusable closure means disposed within said tube, spaced aftwardly from said tube forward end;
means for initially filling said intermediate portion of said tube with a volume of gaseous fuel and a volume of gaseous oxidizer, which volumes when intermixed form a combustible gaseous propellant and for controlling the opening of said aft and forward closure means;
an asymmetrically elongate projectile having an external surface configuration including discrete, successive surface portions separated by transitions, the maximum diameter of said projectile being less than the minimum inner diameter of said inner tube surface to define an annular gap between said projectile and tube surface;
said surface portions being selected to provide a supersonic combustion ram jet effect in said gap between said inner tube surface and said external surface configuration following the insertion of said projectile above a minimum velocity into said propellant-containing intermediate tube portion;
said supersonic combustion ram jet effect providing in sequence at said successive surface portions:
  compression of said propellant,
  ignition of said propellant,
  combustion of said propellant, and
  expansion of the products of combustion of said propellant; and
means for inserting said projectile into said tube through said aft end at said velocity above a minimum velocity having a muzzle which is spaced aft of said open aft end of said launch tube.

12. A system according to claim 11 wherein:
said inner tube surface has along the length of the intermediate tube portion an inner diameter which varies to vary said gap to optimize the pattern of shock waves set up between said projectile and said inner tube surface to optimize the compression of said propellant as said projectile accelerates through different Mach numbers.

13. A process of accelerating a projectile along a launching tube, comprising:
  (i) providing a propellant within a closed intermediate length of said tube by providing seriatim:
    (a) a central core volume of relatively pure fuel which is nonflammable, and
    (b) a surrounding annular volume of mixed fuel and oxidizer which is flammable;
  (ii) propelling said projectile into said tube;
  (iii) opening said closed intermediate length of said tube prior to the entry therein of said projectile to permit said propellant to flow within said tube in the direction of travel of said projectile before said projectile has entered said volume of propellant; and
  (iv) providing relative flow of intermixed combustible gaseous propellant through an annular gap between the outer surface of said projectile and the inner surface of said tube whereby the flow of intermixed combustible gaseous propellant is progressively:
    (a) compressed,
    (b) ignited,
    (c) combusted, and
    (d) expanded.

* * * * *